United States Patent [19]
Hoslett

[11] Patent Number: 6,152,427
[45] Date of Patent: *Nov. 28, 2000

[54] TRUCK CAP HOISTING SYSTEM

[76] Inventor: Glenn J. Hoslett, 2119 Yvonne St., Waukesha, Wis. 53188

[*] Notice: This patent is subject to a terminal disclaimer.

[21] Appl. No.: 09/415,563

[22] Filed: Oct. 8, 1999

Related U.S. Application Data

[63] Continuation-in-part of application No. 09/140,384, Aug. 26, 1998, Pat. No. 5,984,275.

[51] Int. Cl.$^7$ ........................................................ B66D 1/36
[52] U.S. Cl. ............................ 254/338; 248/327; 294/74; 414/626
[58] Field of Search ..................................... 254/269, 334, 254/335, 336, 338, 343, 217, 218; 248/327, 323; 150/166, 168; 383/22, 97, 67; 296/136; 160/370.2; 414/626; 294/74; 410/103

[56] References Cited

U.S. PATENT DOCUMENTS

| | | | |
|---|---|---|---|
| 192,415 | 6/1877 | Castelman . | |
| 433,002 | 7/1890 | Hensley . | |
| 973,572 | 10/1910 | Sims | 254/338 |
| 2,738,204 | 3/1956 | Ibey | 410/103 |
| 2,946,563 | 7/1960 | Eaton | 410/103 |
| 3,934,919 | 1/1976 | Smith | 294/74 |
| 4,066,287 | 1/1978 | Rowley | 294/74 |
| 4,113,146 | 9/1978 | Williamson | 383/67 X |
| 4,362,292 | 12/1982 | Rowan et al. | 254/336 |
| 4,600,177 | 7/1986 | Fritz | 254/338 |
| 4,830,427 | 5/1989 | Fiocchi | 296/136 |
| 5,240,305 | 8/1993 | Trethewey | 296/136 |
| 5,263,687 | 11/1993 | Garbiso | 254/334 |
| 5,282,706 | 2/1994 | Anthoney et al. | 254/218 X |
| 5,320,394 | 6/1994 | Urbank | 294/74 |
| 5,897,104 | 4/1999 | Garbiso | 254/334 |

*Primary Examiner*—Donald P. Walsh
*Assistant Examiner*—Emmanuel M. Marcelo
*Attorney, Agent, or Firm*—Donald J. Ersler

[57] ABSTRACT

A truck cap hoisting system includes a winch, at least one pulley, at least two support channels, at least two lifting strap assemblies, and a lifting line. The truck cap lifting system is preferably installed in a garage. The winch and a guide pulley are attached to a wall of the garage. The lift pulley is attached to a ceiling or an overhead beam. The lifting line is fastened to a lift ring and a reel of the winch. Each lifting strap assembly is threaded through one end of the at least two support channels. The truck cap is hoisted off the pick-up truck by first placing spacers between the truck box and the truck cap and sliding support channels in the gap. The same procedure is repeated for the opposite side. Four S-hooks extending from the at least two lifting assemblies are attached to the lift ring. The winch is then rotated until the truck cap is hoisted to a suitable height. The at least two support channels could be eliminated by forming at least four slots in the bottom of the truck cap sides. The lifting strap assemblies would be threaded through the slots in the bottom of the truck cap sides. Support lines may be attached to the sides of the truck cap instead utilizing strap assemblies and slots. The truck cap hoisting system may be modified to accommodate the removal of a water craft from the top of a vehicle by attaching support bars to each end of the support channels. A canoe hoisting system utilizes the yokes of a canoe to lift thereof.

18 Claims, 12 Drawing Sheets

TRUCK CAP HOISTING SYSTEM

CROSS-REFERENCES TO RELATED APPLICATIONS

This is a continuation-in-part application, Ser. No. 09/140,384, filed on Aug. 26, 1998, now U.S. Pat. No. 5,984,275.

BACKGROUND OF THE INVENTION

1. Field of the Invention

The present invention relates generally to hoisting devices and more specifically to a truck cap hoisting system which allows a single person to lift a truck cap off a pick-up truck and store thereof above the pick-up truck.

2. Discussion of the Prior Art

A problem frequently encountered with pick-up trucks is how to remove a truck cap and store thereof. It takes at least two persons to remove a truck cap from a pick-up truck, because of the truck cap weight and awkwardness. Moreover, most people do not have sufficient space in a garage or elsewhere to store a truck cap.

Accordingly, there is a clearly felt need in the art for a truck cap lift system which allows a single user to remove a truck cap and have a place to store thereof after removal.

SUMMARY OF THE INVENTION

The primary objective of the present invention is to provide a truck cap lift system which allows a single user to remove a truck cap and have a place to store thereof after removal.

According to the present invention, a truck cap lift system includes a winch, at least one pulley, at least two support channels, at least two lifting strap assemblies, and a lifting line. The truck cap lifting system is preferably installed in a garage. The winch is attached to a stud or support structure on the wall of a garage. A guide pulley is preferably attached to the stud or support structure above the winch. A lift pulley is attached to an overhead beam or stud in line with the winch. One end of the lifting line is fastened to a lift ring and the other end to a reel of the winch. Each lifting strap assembly includes a lifting strap, a ratchet tensioner, and a tensioning strap. One end of the lifting strap is terminated by an S-hook and the other end is fastened to the ratchet tensioner. One end of the tensioning strap is terminated by an S-hook and the other end is retained by a ratchet reel of the ratchet tensioner. The at least two lifting strap assemblies could be replaced with at least two lifting straps which have S-hooks on each end. The at least two lifting straps could have special lengths for each size truck cap or be made one length to fit most truck caps. The disadvantage to non-adjustable lifting straps is the inability to lift a cap which has different heights.

Each support channel is preferably fabricated from an angle structure. The support channel has a bottom leg and a side leg. The bottom leg has a lengthwise slot at each end which is sized to loosely receive the at least two lifting straps. The side leg preferably has an angled slot at each end which is preferably disposed above the lengthwise slot. The angled slot is sized to loosely receive the at least two of lifting straps. After each lifting strap is threaded through the slots in each support channel, each lifting strap is attached to the ratchet tensioner.

The truck cap is hoisted off the pick-up truck in the following manner. The truck cap is unfastened from the pick-up truck. Next, the truck cap is lifted up at the front on one side and a spacer is placed between the truck cap and the truck bed. Next, the truck cap is lifted up on the same side at the rear and another spacer is inserted between the truck cap and the truck box. The support channel is then inserted in the gap between the truck cap and the truck box. The same procedure is followed for the other side of the truck cap. Preferably, a compression stabilizer bar is placed inside the cap at substantially a rear thereof. A hole is also formed in the bottom of the support channel at substantially each end thereof. A tensioning device is used to keep the support channels against the truck cap. The compression stabilizer bar protects the truck cap from damage at the rear which may be caused by compression during lifting. The four S-hooks extending from the at least two lifting strap assemblies are attached to the lift ring. The winch is then rotated until the truck cap is hoisted to a suitable height.

The at least two support channels could be eliminated if at least four slots were formed in the bottom of the truck cap sides. The at least two lifting straps would be threaded through the slots in the truck cap similar to the slots in the support channels. The slots would be disposed in the truck cap such that the pair of strap assemblies would lift the truck cap at its center of gravity.

The slots in the truck cap may be replaced with a projection. A cable or strap with a ring on one end and a S-hook on the other end would be placed over the projection to lift the truck cap. An extension stabilizer bar would have to be attached to the truck cap to prevent damage during lifting.

The truck cap hoisting system may be modified to accommodate the removal of a canoe, boat, or other water craft from the top of a vehicle. A first support bar would be attached to a first end of each support channel and a second support bar would be attached to a second end of each support channel. The at least two support channels, first support bar and second support bar form a rigid frame. The rigid frame is slipped under the water craft. The winch is then rotated until the water craft is raised to the desired height. The compression stabilizer bar and the bungee cord are not used for the modified truck cap hoisting system.

A canoe lifting system includes a winch, at least one pulley, at least two lifting strap assemblies, and a lifting line. The canoe lifting system is preferably installed in a garage. The winch is attached to a stud or support structure on the wall of a garage. A guide pulley is preferably attached to the stud or support structure above the winch. A lift pulley is attached to an overhead beam or stud in line with the winch. One end of the lifting line is fastened to a lift ring and the other end to a reel of the winch. Each lifting strap assembly includes a lifting strap, a ratchet tensioner, and a tensioning strap. One end of the lifting strap is terminated by an S-hook and the other end is fastened to the ratchet tensioner. One end of the tensioning strap is terminated by an S-hook and the other end is retained by a ratchet reel of the ratchet tensioner.

The canoe is hoisted off the top of a vehicle in the following manner. Each lifting strap is wrapped around the yokes on one side of the canoe. The S-hook on each end of the lifting strap assembly is attached to the lifting ring. Next, the winch is rotated until the canoe is lifted off the top of the vehicle.

Accordingly, it is an object of the present invention to provide a truck cap hoisting system which allows a single operator to lift a truck cap off a pick-up.

It is a further object of the present invention to provide a truck cap hoisting system which allows a truck cap to be stored in a convenient fashion.

It is yet a further object of the present invention to provide a truck cap hoisting system which allows a manufacturer of truck caps to modify their product to be easily lifted off a pick-up truck.

It is yet a further object of the present invention to provide a truck cap hoisting system which may be modified to easily hoist a water craft off a vehicle.

It is yet a further object of the present invention to provide a canoe lifting system which may be used to easily lift a canoe off the top of a vehicle.

Finally, it is another object of the present invention to provide a truck cap hoisting system which may be modified to easily store a water craft in a garage.

These and additional objects, advantages, features and benefits of the present invention will become apparent from the following specification.

DETAILED DESCRIPTION OF THE PREFERRED EMBODIMENTS

Figure 1:
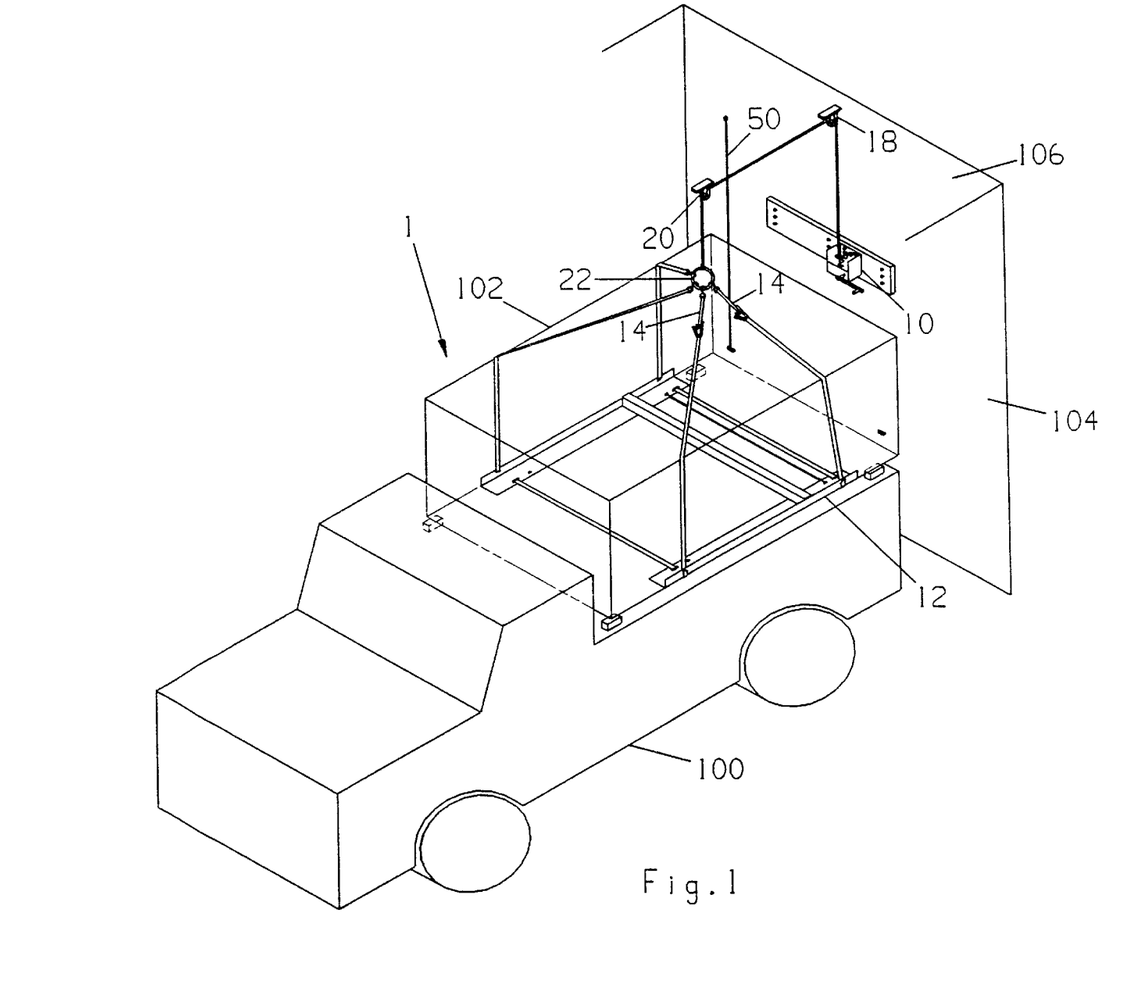
FIG. 1 is a perspective view of a truck cap being hoisted off a pick-up truck with a truck cap hoisting device in accordance with the present invention.
Figure 2:
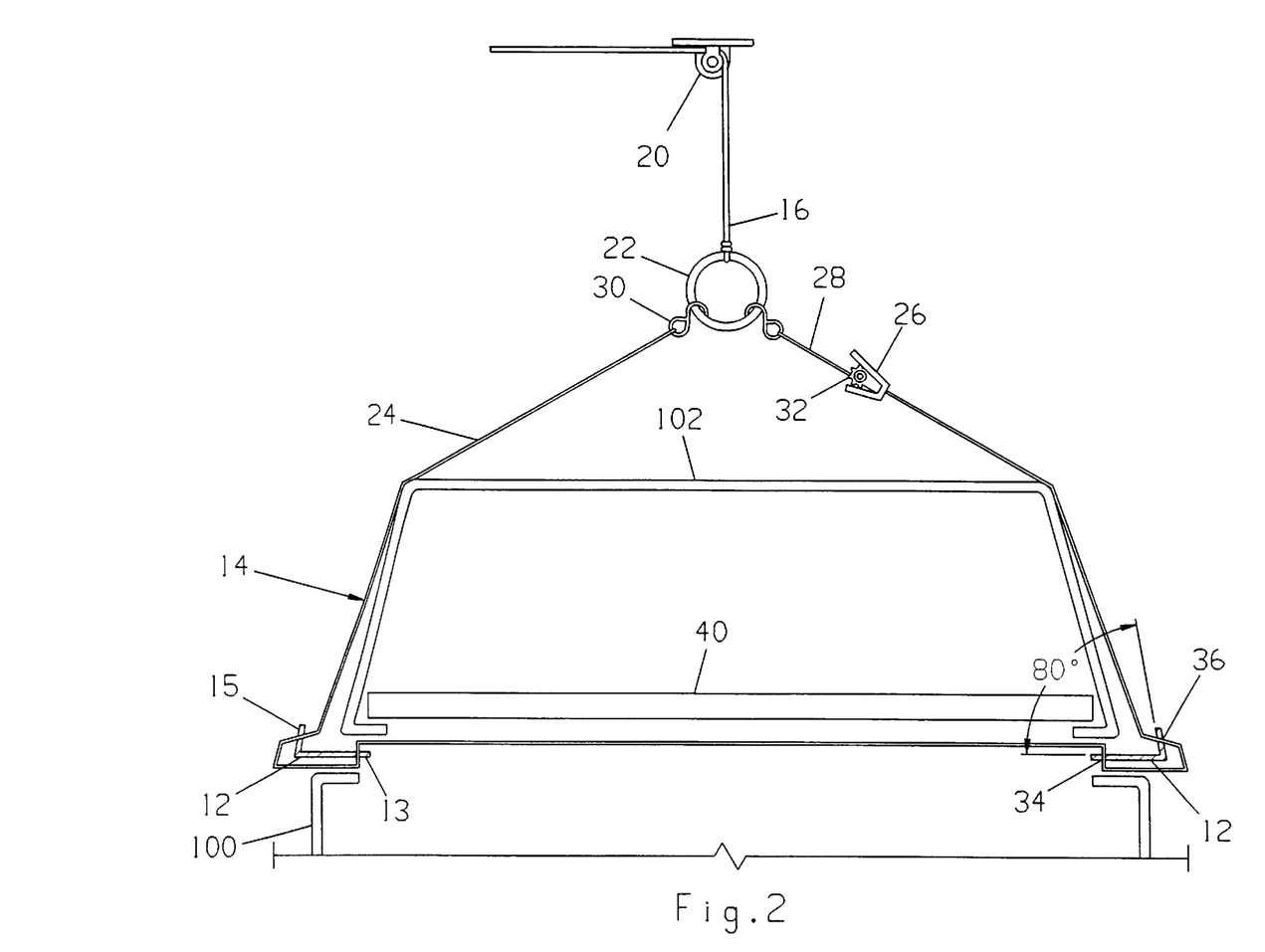
FIG. 2 is a rear view of a truck cap being hoisted off a pick-up truck with a truck cap hoisting device in accordance with the present invention.
Figure 3:
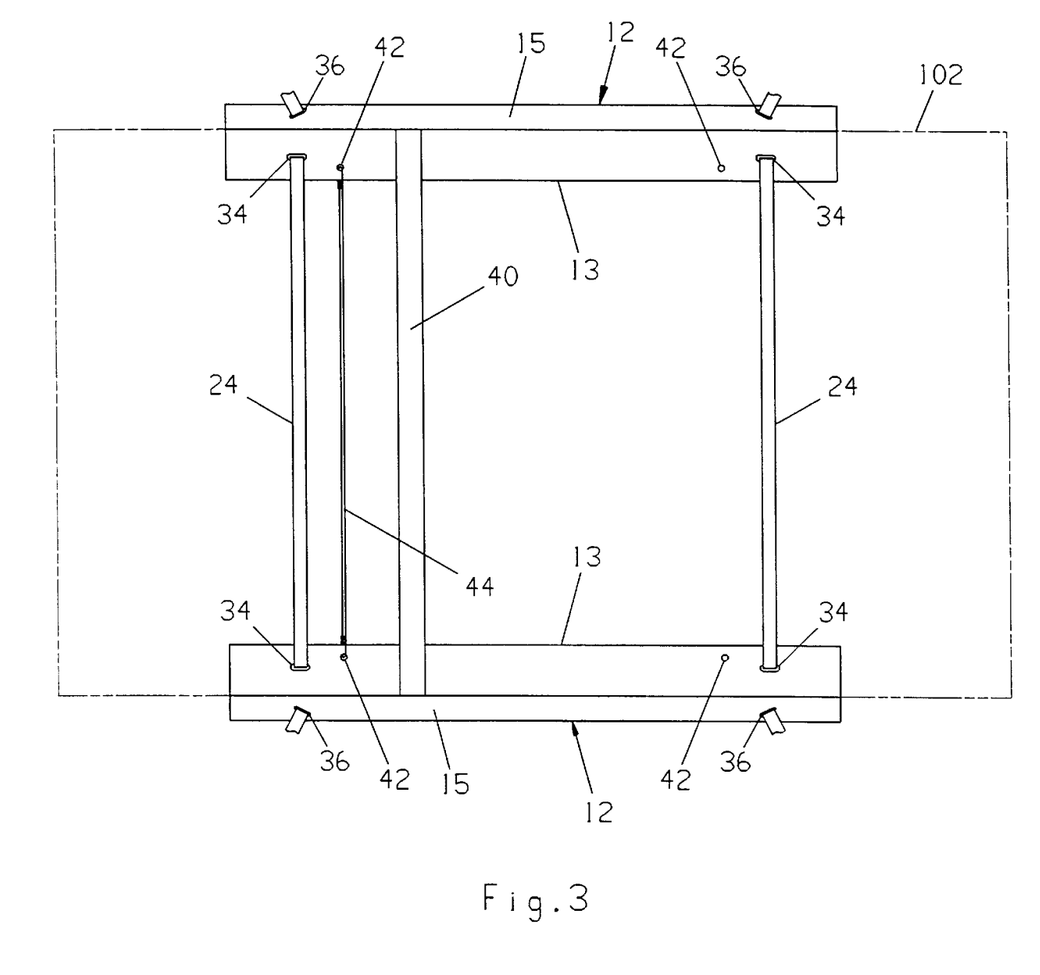
FIG. 3 is a top view of two channel supports providing support for a truck cap in accordance with the present invention.
Figure 4:
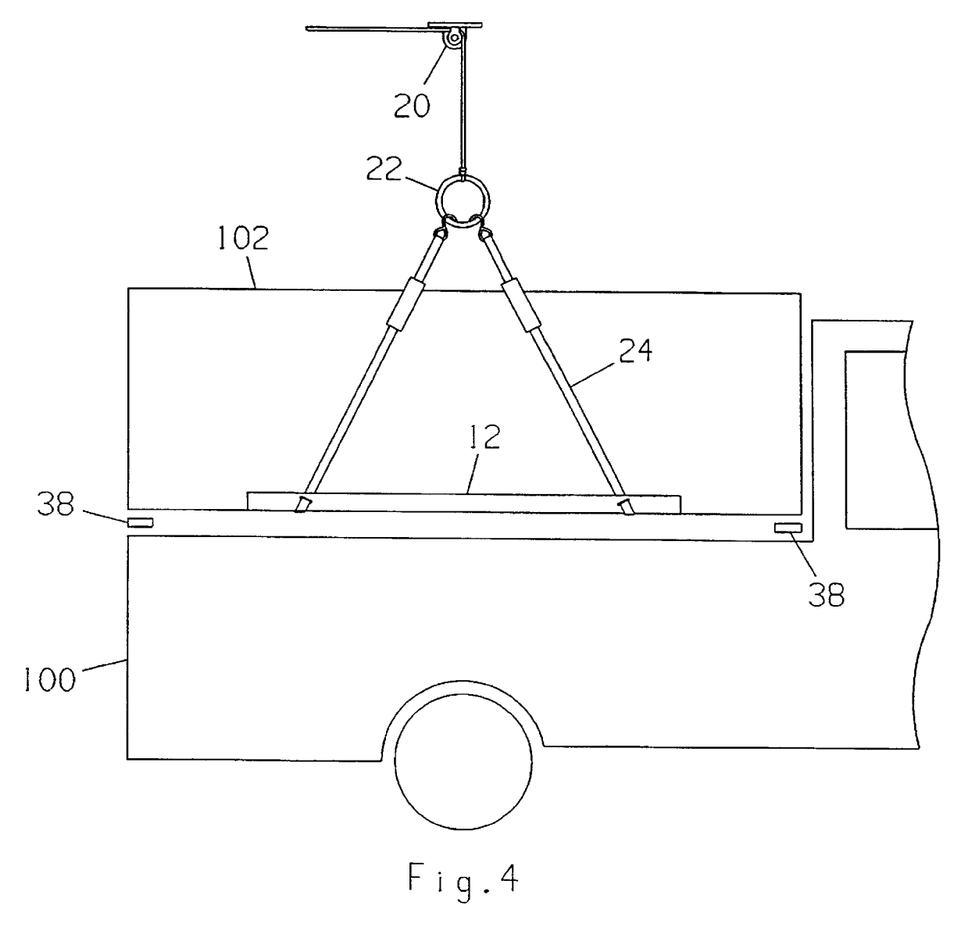
FIG. 4 is a side view of a truck cap, and a two spacers disposed on the truck in accordance with the present invention.

With reference now to the drawings, and particularly to FIG. 1, there is shown a perspective view of a truck cap hoisting system 1. With reference to FIGS. 2–4, the truck cap hoisting system 1 includes a winch 10, at least one pulley, at least two support channels 12, at least two lifting strap assemblies 14, and a lifting line 16. FIG. 2 shows separation between some items for the sake of clarity. The truck cap lifting system 1 is preferably installed in a garage.

The winch 10 is attached to a stud or support structure on the wall 102 of a garage. A guide pulley 18 is preferably attached to the stud or support structure above the winch 10. A lift pulley 20 is attached to an overhead beam or stud on the ceiling 106 of the garage in line with the winch 10. The lifting line 16 is fastened to a lift ring 22 and a reel of the winch 10. The lifting line 16 is preferably fabricated from a rope or cable preferably having a rating of at least 300 pounds. Each lifting strap assembly 14 includes a lifting strap 24, a ratchet tensioner 26, and a tensioning strap 28. One end of the lifting strap is terminated by an S-hook 30 and the other end is fastened to the ratchet tensioner 26. One end of the tensioning strap 28 is terminated by an S-hook 30 and the other end is retained by a ratchet reel 32 of the ratchet tensioner 26. A lifting strap assembly 14 which provides satisfactory performance may be purchased from USA Products of California. Lifting straps manufactured from other companies may also be used.

The at least two lifting strap assemblies 14 could be replaced with at least two lifting straps 24 which have S-hooks on each end. The at least two lifting straps 24 could have special lengths for each size truck cap, made one length to fit most truck caps, or made to a small number of lengths to fit different size truck caps. One disadvantage to non-adjustable lifting straps 24 is the inability to hoist a truck cap which has different heights.

Each support channel 12 is preferably fabricated from an angle structure. The support channel 12 has a bottom leg 13 and a side leg 15, the legs preferably have an included angle of 80 degrees. The 80 degree angle forces the strap to contact each side of the truck cap 102. The bottom leg 13 has a lengthwise slot 34 at each end which is sized to loosely receive the at least two lifting straps 24. The side leg 13 preferably has an angled slot 36 at each end which is preferably disposed above the lengthwise slot 34. The angled slot is sized to loosely receive the at least two lifting straps 24. After each lifting strap 24 is threaded through the slots in the at least two support channels 12, each lifting strap 24 is attached to a ratchet tensioner 26. The other end of each ratchet tensioner 26 has a tensioning strap 28 extending therefrom. The distance between the slots is preferably at least 2½ feet. If no ratchet tensioner 26 is used each end of the lifting strap 24 is threaded through the support channels 12 and then attached to S-hooks 30.

The truck cap 102 is hoisted off the pick-up truck 100 in the following manner. The truck cap 102 is unfastened from the pick-up truck 100. Next, the truck cap is lifted up at the front on one side and a spacer 38 is placed between the truck cap 102 and the truck bed. Next, the truck cap 102 is lifted up on the same side at the rear and another spacer 38 is inserted between the truck cap and the truck box. The support channel 12 is then inserted in the gap between the truck cap and the truck box. The same procedure is followed for the other side of the truck cap 102.

Preferably, a compression stabilizer bar 40 is placed inside the truck cap 102 at substantially a rear thereof. A hole 42 is also formed in the bottom leg 13 of the support channel 12 at substantially each end thereof. A tensioning device 44 is inserted into the holes 42. The tensioning device 44 is used to keep the support channels 12 against the truck cap 102. The tensioning device 44 is preferably a bungee cord, but could be other devices. The compression stabilizer bar 40 protects the truck cap 102 from damage which would be caused by the lifting strap 24 squeezing or compressing the unsupported rear of the truck cap 102 during lifting.

Figure 8:
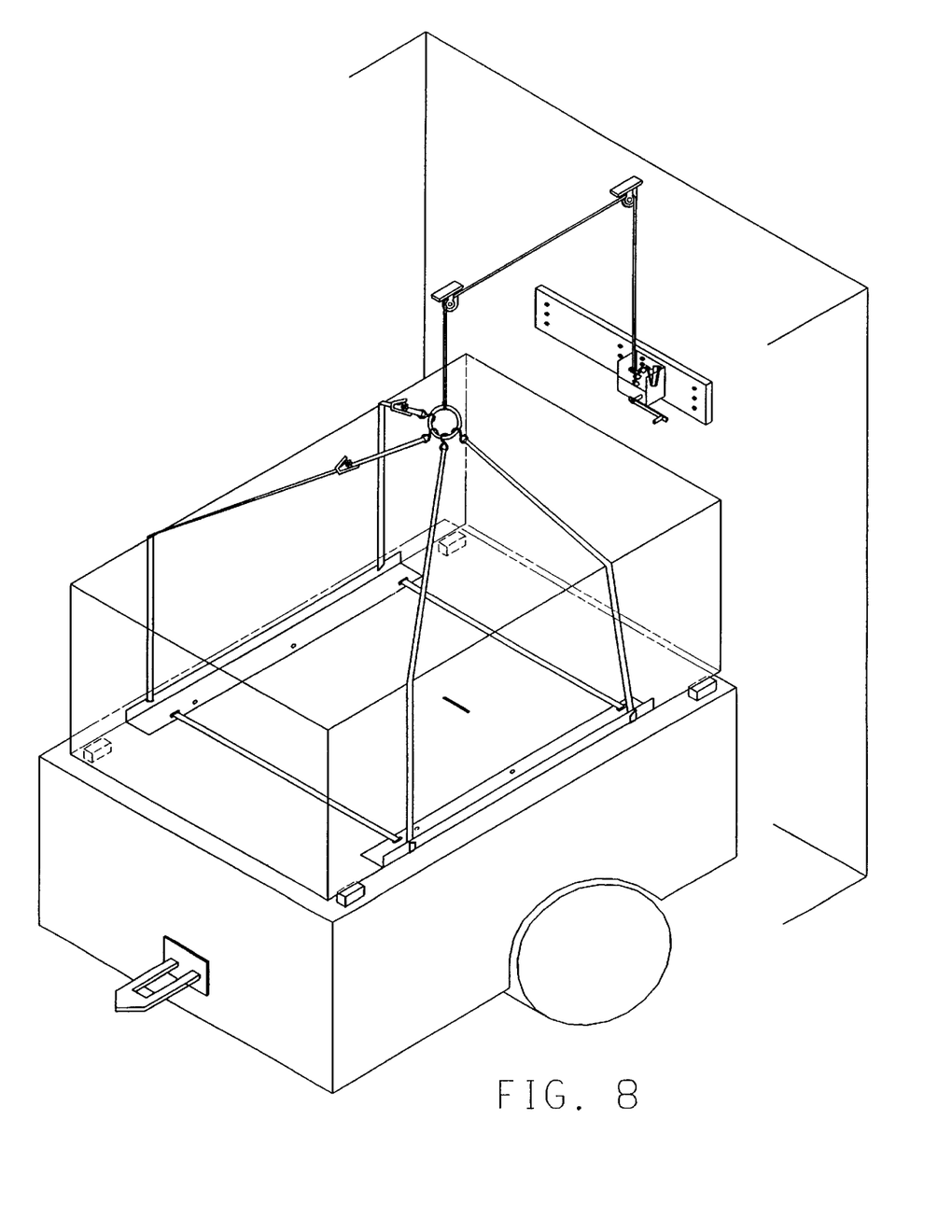
FIG. 8 is a perspective view of a folding camper being lifted off a trailer in accordance with the present invention.
Figure 9:
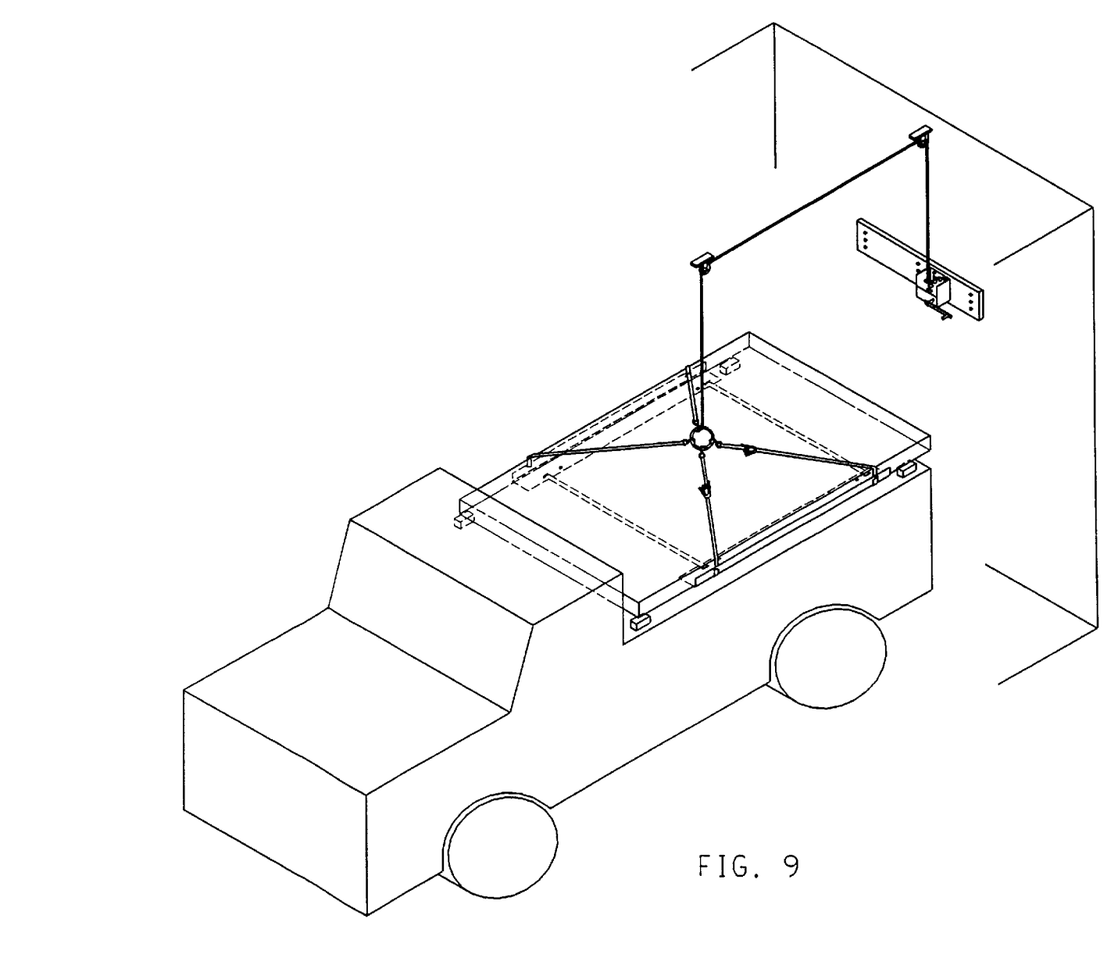
FIG. 9 is a perspective view of a tonneau lid being lifted off a pick-up truck bed in accordance with the present invention.
Figure 10:
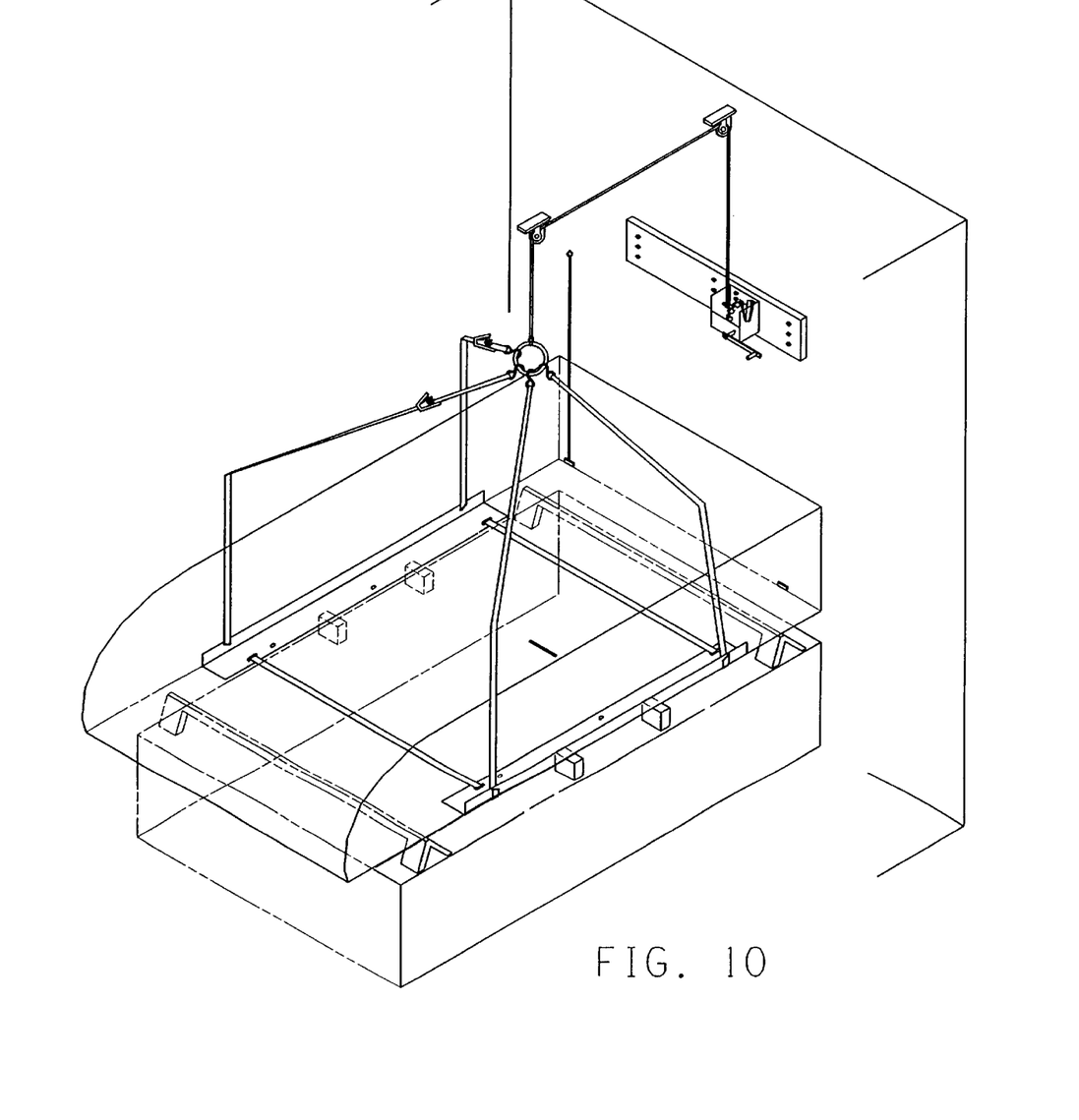
FIG. 10 is a perspective view of a flat bottom boat being lifted off a truck cap in accordance with the present invention.

The four S-hooks 30 extending from the at least two lifting straps 24 are attached to the lift ring 22. The at least two support channels 12 should be centered such that the truck cap 102 does not tilt to one side during hoisting. The pick-up truck 100 should be moved to facilitate the centering of the lifting line 16 relative to the truck cap 102. The ratchet tensioners 26 are tightened such that there is no slack in the lifting straps 24. The winch 10 is then rotated until the truck cap 102 is lifted to a suitable height. The truck cap lifting system should not be limited to merely lifting truck caps, but could include lifting other items such as campers, tonneau lids, and flat bottom boats as shown in FIGS. 8, 9, and 10, respectively.

Figure 5:
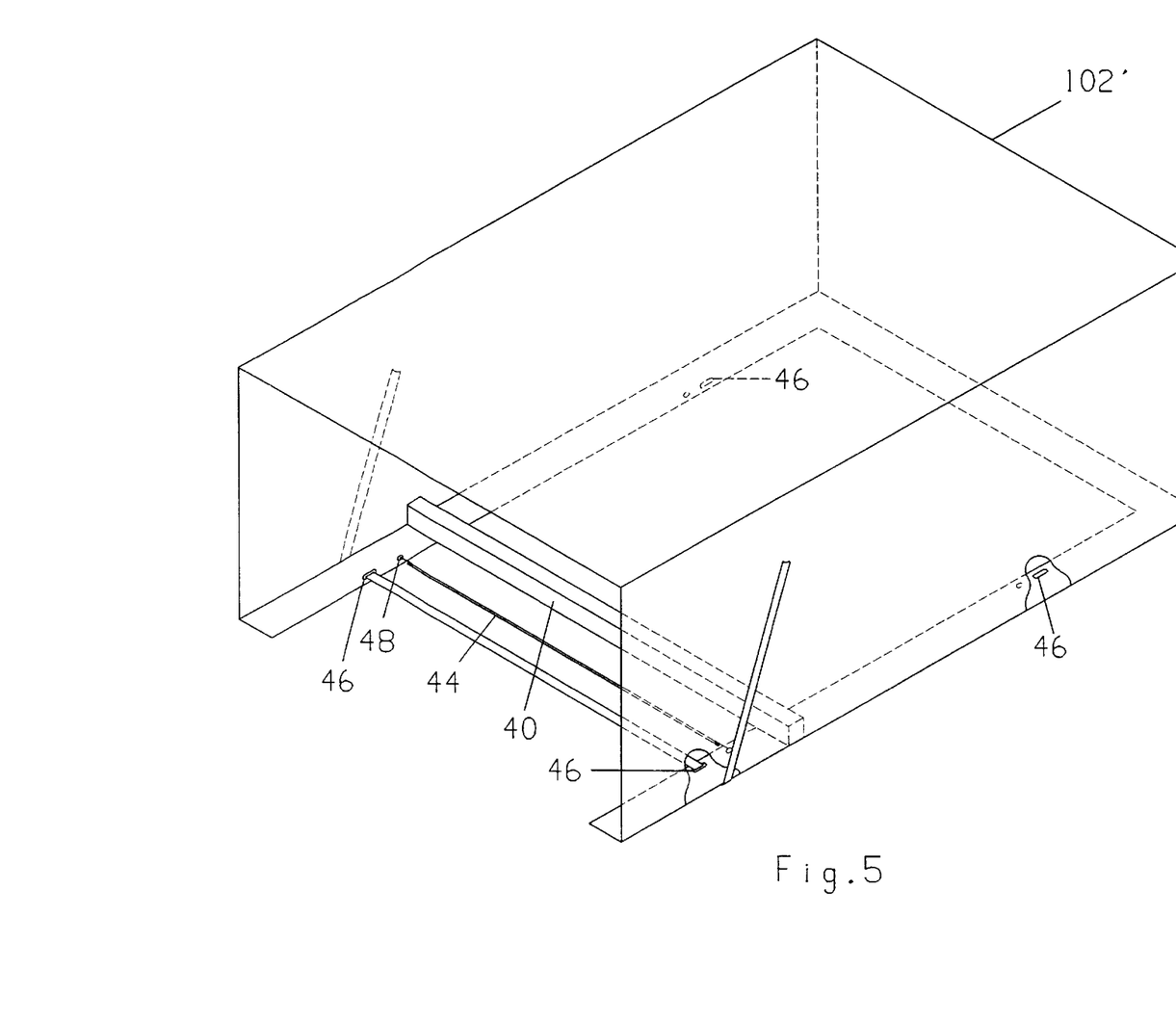
FIG. 5 is a perspective view of a truck cap which has been modified to include slots for receiving lifting straps in accordance with the present invention.

An optional stabilizer cord 50 may be used to prevent the truck cap 102 from rotating about the lifting line 16. One end of the stabilizer cord 50 is attached to a projection on the front or rear of the truck cap 102; the other end of the stabilizer cord 50 is attached to the ceiling 106 or a wall 104. The stabilizer cord 50 makes it easier to load the truck cap 102 back on to the pick-up truck 100. With reference to FIG. 5, the at least two support channels 12 could be eliminated if at least four slots 46 were formed on the bottom edges of the truck cap 102. The at least two lifting straps 24 would be threaded through the slots 46 as they would through the slots in the support channels 12. The slots 46 should be disposed in the bottom edges of the truck cap 102 such that the lifting straps 24 would hoist the truck cap 102 at its center of gravity. The distance between the slots would preferably be at least 2½ feet. Two tensioning holes 48 are necessary for the optional attachment of the tensioning device 44. The compression stabilizer bar 40 is still needed to prevent the lifting straps 24 from damaging the truck cap 102' by compression.

Figure 6:
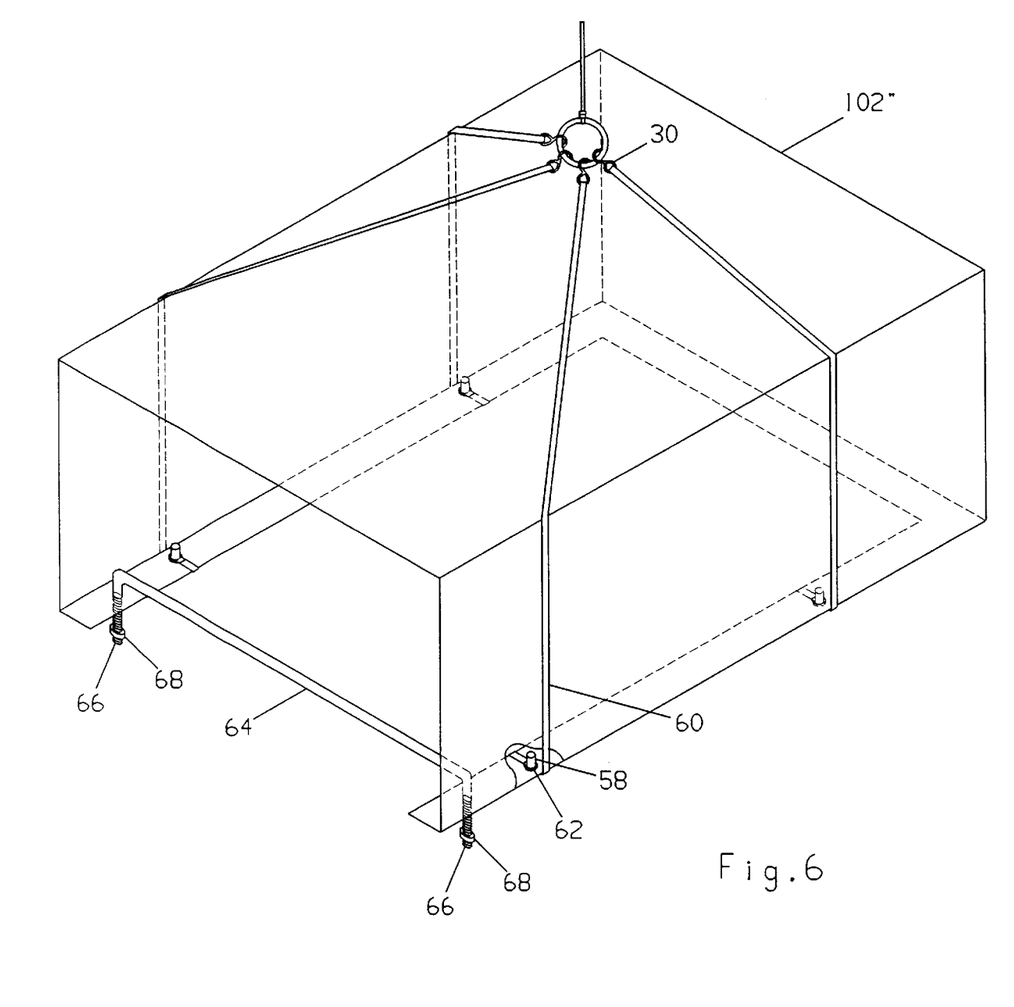
FIG. 6 is a perspective view of a truck cap which has been modified with upstanding projections for receiving lifting straps in accordance with the present invention.

FIG. 6 shows that the preformed slot 46 in the truck cap 102" may be replaced with a projection 58. A support line 60 which may be a cable or strap with a ring 62 on one end and an S-hook 30 on the other end would be placed over the projection 58 to lift the truck cap 102". An extension stabilizer bar 64 needs to be attached to the truck cap bottom edges to prevent damage from the sides being stretched apart during hoisting. Holes are formed in the bottom edges of the truck cap 102" to receive threaded ends 66 of the extension stabilizer bar 64. A nut 68 may be threaded onto the threaded ends 66 to prevent the extension stabilizer bar 64 from coming out of the holes during hoisting of the truck cap 102". The extension stabilizer bar 64 should not be limited to the design shown, but could include any design which prevents the sides of the truck cap 102" from spread and is easily fastenable to the truck cap 102". The extension stabilizer bar 64 could serve as a replacement for the compression stabilizer bar 40 and tensioning device 44.

Figure 7:
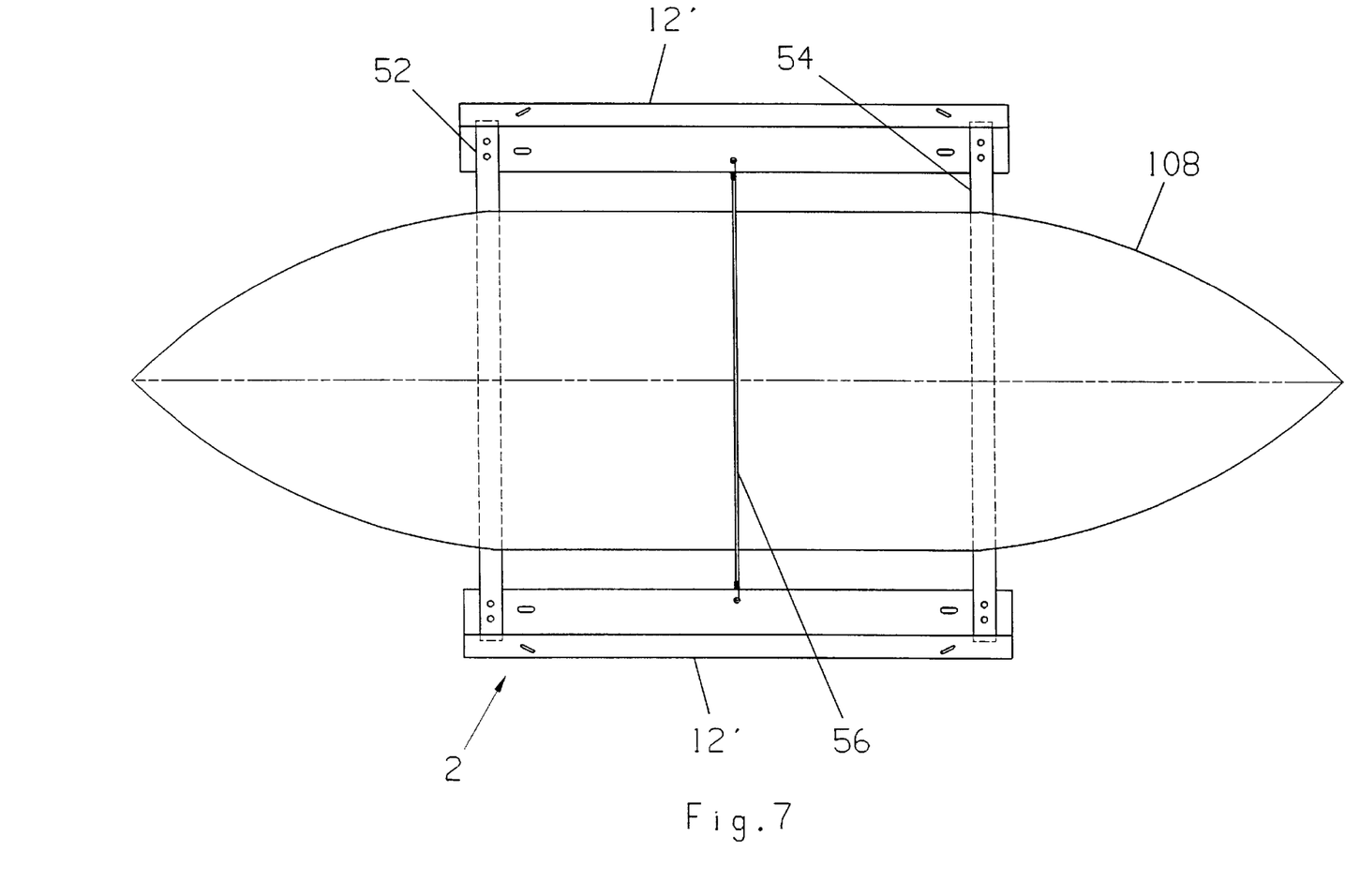
FIG. 7 is a top view of two support channels which have been modified to accommodate lifting a water craft in accordance with the present invention.

The projection 58 and ring 62 attachment combination is not the only way in which a support line 60 may be attached to the truck cap 102". The following are only some examples, but not every alternate means of attaching the support line 60 to the bottom edges, sides, or top of the truck cap 102". A plurality of plates may be fastened to the truck cap 102". A hole would be formed in each plate and the support line would have a hook which would be inserted into the hole. The plurality plates could be replaced with a U-shaped handle. The hook would be placed around the U-shaped handle. An eye bolt could be substituted for the U-shaped handle. The hook could be replaced with a snap clip. The hook could be mounted to the truck cap and a U-shaped handle to the support line. The support line 60 could be made adjustable by adding a ratchet tensioner. Only three support lines 60 are needed if the support lines 60 are attached to the top of the truck cap 102". FIG. 7 shows that the truck cap hoisting system 1 may be modified to accommodate the removal of a canoe, boat, or other water craft 108 from the top of a vehicle. A first support bar 52 is attached to a first end of each support channel 12' and a second support bar 54 is attached to a second end of each support channel 12'. The support bars may be attached to the support channels 12' utilizing any suitable fastening method such as nuts and bolts. The support channels 12', first support bar 52 and second support bar 54 form a rigid structure. The support bars 52 preferably do not rotate relative to the support channels 12. The modified truck cap hoisting system 2 is slipped under the water craft 108. The winch 10 is then turned until the water craft 108 is hoisted to the desired height. No stabilizer bars are not used for the modified truck cap hoisting system 2. Preferably, at least one tensioning strap 56 is used to retain the water craft 108 relative to the modified truck cap hoisting system 2. The tensioning strap 56 is preferably a bungee cord.

Figure 11:
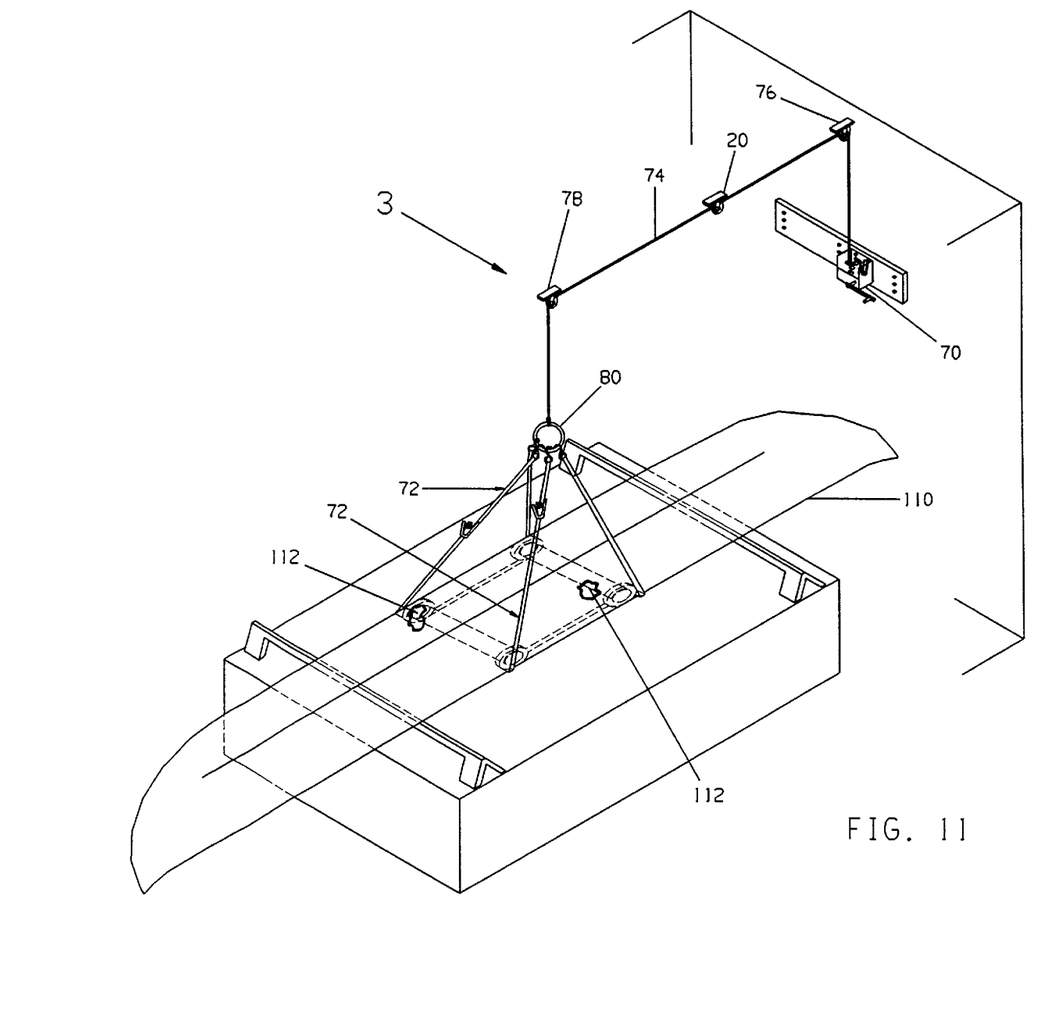
FIG. 11 is a perspective view of a canoe being lifted with a canoe lifting system in accordance with the present invention.

With reference to FIGS. 10 and 11, a canoe lifting system 3 includes a winch 70, at least one pulley, at least two lifting strap assemblies 72, and a lifting line 74. The canoe lifting system 3 is preferably installed in a garage. The lifting pulley 20 is not required for the canoe lifting system 3, but included to show where the lifting pulley 20 would be located if a truck cap hoisting lift system 1 were also used. The winch 70 is attached to a stud or support structure on the wall of a garage. A guide pulley 76 is preferably attached to the stud or support structure above the winch 70. A lifting pulley 78 is preferably attached to an overhead beam or stud in line with the winch 70. One end of the lifting line 74 is fastened to a lift ring 80 and the other end to a reel of the winch 70. Each lifting strap assembly 72 includes a lifting strap 82, a ratchet tensioner 84, and a tensioning strap 86. One end of the tensioning strap 86 is terminated by an S-hook 88 and the other end is retained by a reel of the ratchet tensioner 84.

Figure 12:
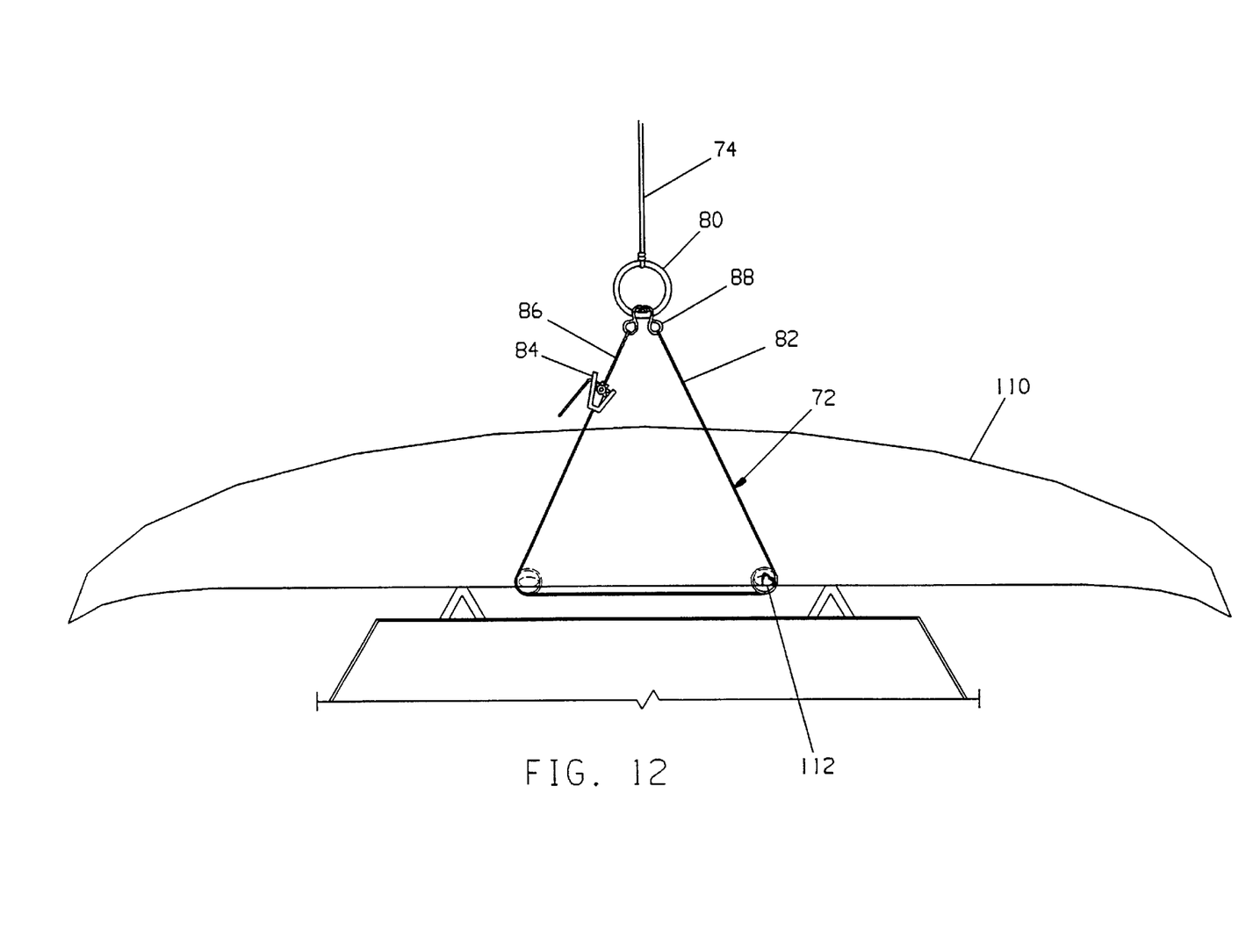
FIG. 12 is a side view of a canoe being lifted with a canoe lifting system in accordance with the present invention.

A canoe 110 is hoisted off the top of a vehicle in the following manner. Each lifting strap 82 is wrapped around the yokes 112 on each side of the canoe 110. The S-hook 88 on each end of the lifting strap assembly 72 is attached to the lifting ring 80. Next, the winch 70 is rotated until the canoe 110 is lifted off the top of the vehicle.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention. The truck cap hoisting system should not be limited to lifting truck caps off of pick-up trucks, but should include hoisting any object off of any vehicle, or lifting and storing any object.

I claim:

1. An object hoisting system comprising:
   at least two support channels, each said support channel having at least one slot disposed on each end thereof;
   at least two lifting strap assemblies, each lifting strap assembly being threaded through a slot in one end of said support channel;
   a lifting line being attached to ends of said at least two lifting strap assemblies; and
   said lifting line being attached to a winch, said winch being rotated to hoist said object.

2. The object hoisting system of claim 1, further comprising:
   said strap assembly having a lifting strap, a tensioning strap, and a ratchet tensioner, said tensioning strap being tightened with said ratchet tensioner such that there is no slack in said lifting strap.

3. The object hoisting system of claim 1, further comprising:

said support channel having a bottom leg and a side leg, a lengthwise slot being disposed in each end of said bottom leg, an angled slot being disposed in each end of said side leg.

4. A modified truck hoisting system comprising:

a truck cap having at least two slots disposed in each side at bottom edges thereof;

at least two lifting straps, each lifting strap being inserted through said at least two slots in one side of the truck cap;

a lifting line being attached to each end of said at least two lifting straps; and said lifting line being attached to a winch, said winch being rotated to lift said truck cap.

5. The modified truck cap hoisting system of claim 4, further comprising:

said lifting strap including a ratchet tensioner, said ratchet tensioner allowing slack to be removed from said lifting strap.

6. An object hoisting system comprising:

at least two support channels, each said support channel having at least one slot disposed on each end thereof;

at least two lifting straps, each lifting strap being inserted through a slot in one end of said support channel;

a lifting line being attached to each end of said at least two lifting straps; and said lifting line being attached to a winch, said winch being rotated to hoist said object.

7. The object hoisting system of claim 6, further comprising:

said support channel having a bottom leg and a side leg, a lengthwise slot being disposed in each end of said bottom leg, an angled slot being disposed in each end of said side leg.

8. An object hoisting system comprising:

an object having at least three means for attachment to at least three support lines;

a lifting line;

each said support line having a means for attachment to a truck cap on one end, each said support line being attached to said lifting line on the other end; and said lifting line being attached to a winch, said winch being rotated to lift said truck cap.

9. The object hoisting system of claim 8, further comprising:

an extension stabilizer bar being inserted into said truck cap to prevent damage from the sides of said truck cap from stretching apart.

10. The object hoisting system of claim 8, further comprising:

said support line having an S-hook extending from an end opposite said means for attachment to said truck cap; and said plurality of S-hooks being retained by a lift ring, said lift ring being fastened to said lifting line.

11. The object hoisting system of claim 8, further comprising:

at least one pulley being utilized to support said lifting line.

12. The object hoisting system of claim 8, further comprising:

a stabilizer cord being attached to said truck cap to prevent thereof from rotating about said lifting line.

13. The object hoisting system of claim 8, further comprising:

said support line including a ratchet tensioner, said ratchet tensioner allowing slack to be removed from said support line.

14. A canoe lifting system for lifting the canoe by yokes thereof comprising:

at least two lifting strap assemblies, each said lifting strap assembly having a lifting strap, a tensioning strap, and a ratchet tensioner, each said lifting strap being wrapped around the yokes on one side of the canoe;

a lifting line being attached to ends of said at least two lifting strap assemblies; and said lifting line being attached to a winch, said winch being rotated to hoist said object.

15. The canoe lifting system for lifting the canoe by yokes thereof of claim 14, further comprising:

an S-hook being disposed at one end of each said lifting strap and the other end being attached to said ratchet tensioner;

an S-hook being disposed at one end of each said tensioning strap and the other end being attached to a reel of said ratchet tensioner.

16. The canoe lifting system for lifting the canoe by yokes thereof of claim 15, further comprising:

said plurality of S-hooks being retained by a lift ring, said retaining ring being fastened to said lifting line.

17. The canoe lifting system for lifting the canoe by yokes thereof of claim 14, further comprising:

at least one pulley being utilized to support said lifting line.

18. A method for lifting a canoe by yokes thereof comprising the steps of:

(a) wrapping a lifting strap around the yokes of the canoe on each side of said canoe;

(b) attaching one end of each said lifting strap to one end of a lifting line and the other end of each said lifting strap to a ratchet tensioner;

(c) attaching one end of a tensioning strap to a reel of said ratchet tensioner and the other end of said tensioning strap to the one end of said lifting line; and (d) attaching the other end of said lifting line to a winch.

\* \* \* \* \*